(12) United States Patent
Aliev

(10) Patent No.: US 7,007,654 B2
(45) Date of Patent: Mar. 7, 2006

(54) PRE-AND POST-IGNITION AUXILIARY OIL CIRCULATION SYSTEM FOR AN INTERNAL COMBUSTION ENGINE

(76) Inventor: Bulent Aliev, 5555 N. Ocean Blvd., Lauderdale-By-The-Sea, FL (US) 33308

( * ) Notice: Subject to any disclaimer, the term of this patent is extended or adjusted under 35 U.S.C. 154(b) by 2 days.

(21) Appl. No.: 10/632,987

(22) Filed: Aug. 4, 2003

(65) Prior Publication Data

US 2005/0028780 A1 Feb. 10, 2005

(51) Int. Cl.
*F01M 11/10* (2006.01)
(52) U.S. Cl. .............................. 123/196 S; 123/196 R; 184/6.4
(58) Field of Classification Search ............ 123/196 S, 123/196 R, 179.1; 184/6.4, 6.3
See application file for complete search history.

(56) References Cited

U.S. PATENT DOCUMENTS

| | | | | |
|---|---|---|---|---|
| 2,791,699 | A | * | 5/1957 | Taylor ....................... 290/38 R |
| 3,583,527 | A | * | 6/1971 | Raichel ......................... 184/6 |
| 3,917,027 | A | | 11/1975 | Hakanson |
| 4,061,204 | A | * | 12/1977 | Kautz, Jr. ..................... 184/6.3 |
| 4,199,950 | A | * | 4/1980 | Hakanson et al. ......... 60/605.3 |
| 4,560,110 | A | * | 12/1985 | Burda ......................... 241/36 |
| 4,628,877 | A | * | 12/1986 | Sundles et al. .......... 123/196 S |
| 4,936,272 | A | | 6/1990 | Whitmore |
| 5,063,895 | A | * | 11/1991 | Ampferer ............... 123/196 R |
| 5,121,720 | A | | 6/1992 | Roberts |
| 5,511,522 | A | * | 4/1996 | Tran ....................... 123/196 S |
| 5,765,521 | A | * | 6/1998 | Stutzle et al. ............. 123/196 S |
| 2002/0174845 | A1 | * | 11/2002 | Biess .................. 123/142.5 R |

* cited by examiner

*Primary Examiner*—Carl S. Miller
(74) *Attorney, Agent, or Firm*—M. K. Silverman

(57) ABSTRACT

In a system for pre-lubrication of an internal combustion engine of a vehicle having an oil reservoir and at least one oil passageway or galley in communication with an exterior of the engine, there is provided a fluid circuit, external to the engine, including a first conduit having an inlet and an outlet, the inlet in fluid communication with an output of the oil reservoir. The fluid circuit also includes an auxiliary oil hydraulic pump, including a pump motor having an inlet and an outlet, the inlet in fluid communication with the outlet of the first conduit. The fluid circuit also includes a second conduit having an inlet and an outlet, the inlet in fluid communication with the outlet of the pump, the outlet in fluid communication with the engine oil passageway and galleys. The fluid circuit also includes switches and timers for selectably actuating the motor of the oil pump for selectable periods of time prior to, and/or after, ignition. Further included is a valve for selectably closing the outlet of the second conduit at or upstream of the inlet to the engine oil passageway, in which the valve is normally-open.

4 Claims, 6 Drawing Sheets

PRE-AND POST-IGNITION AUXILIARY OIL CIRCULATION SYSTEM FOR AN INTERNAL COMBUSTION ENGINE

BACKGROUND OF THE INVENTION

A. Area of Invention

The invention relates to a lubrication system for an internal combustion engine, which is situated externally to the engine housing.

B. Prior Art

In the operation of an internal combustion engine, it is essential to provide sufficient lubrication of the engine parts to minimize the wear thereof. This normally occurs during operation of the engine. However, various problems may occur when the operative cycle of the engine is initiated, during an obstruction within the oil pump or the so-called oil galley which connects the oil pump to the fluid flow passages within the engine proper, and after the engine has been turned off.

In automotive engines, it is well-known that a vehicle used often and for relatively long periods of time over long distances will experience substantially less engine wear than one that is subjected to numerous starts and stops, that is, one that is used for driven upon many frequent short trips, notwithstanding that the total mileage of the latter may be substantially less than that of a vehicle that is driven frequently and for longer distances. Starting of an engine followed by a short trip, or starting of an engine followed by long periods of non-use is, particularly, prevalent in the marine area. As such, marine engines and standby generators are particularly susceptible to such engine wear. Therein it is estimated that between 70 and 80 percent of all engine wear occurs during the first ten to fifteen seconds of operation of the engine.

It has become accepted in the art that the problem that frequent starting of an engine before adequate oil circulation therein has commenced is advantageously addressed through some type of pre-lubricating system in which, either prior to ignition, or immediately thereafter, an auxiliary means of rapidly providing lubrication to the engine before it begins its normal function (including the lubrication associated therewith) is furnished. This recognition, particularly as it relates to automotive vehicles, is reflected in U.S. Pat. No. 3,197,0027 (1975) to Hakanson et al, entitled System for Pre-lubricating an Occasionally Used, Fuel Cranked, Quick Starting, Fuel Burning Engine; U.S. Pat. No. 4,936,272 (1990) to Whitmore, entitled Prelube System; and U.S. Pat. No. 5,121,720 (1992) to Roberts, entitled Pre-Ignition Lubricating System.

Further, in turbo-charged engines, it is imperative to provide a proper level of oil to the turbo bearings after the engine is shut-down. This issue is rarely addressed in the prior art. More particularly, there does not, to the knowledge of the within inventor, exist an integrated pre- and post-ignition, or other lubrication system, particularly adapted to the geometry and needs of internal combustion engines, nor is there known an external lubrication system of such type capable of providing additional important functions of over-pressure protection, timing control and oil drainage. The instant invention therefore addresses the long-felt need in the vehicle engine art for a single unitary externally positioned system combining, within a single fluid circuit, functions of pre- and post-lubrication, over-pressure protection, timing control and drainage of engine oil.

SUMMARY OF THE INVENTION

In a system for pre- and post-ignition lubrication of an internal combustion engine of a vehicle having an oil reservoir and at least one oil passageway in communication with an exterior of said engine, there is provided a fluid circuit, external to said engine, which circuit includes a first conduit having an inlet and an outlet, said inlet in fluid communication with an output of said oil reservoir. The fluid circuit also includes an auxiliary oil hydraulic pump, including power means therefore, having an inlet and an outlet, said inlet in fluid communication with said outlet of said first conduit. The fluid circuit also includes a second conduit having an inlet and an outlet, said inlet in fluid communication with said outlet of said pump, said outlet in fluid communication with said engine oil passageway and galleys. The inventive fluid circuit also includes means for selectably actuating said power means of said oil pump, for selectable periods of time, and/or after prior to ignition. Further included are means for selectably closing said outlet of said second conduit at or upstream of said inlet to said engine oil passageway, in which said closing means are normally-open. The fluid circuit further includes a third conduit having an inlet and an outlet, said inlet in fluid communication with said outlet of said second conduit, said inlet disposed upstream of said normally-open outlet of said second conduit. Further included is a fourth conduit having an inlet and an outlet, said inlet in fluid communication with said outlet of said third conduit, and a pressure relief valve disposed within said fourth conduit between said inlet and outlet thereof, whereby an actuation of said pressure release valve will occur responsive to an obstruction within the engine oil galley or if the oil input valve to the engine is inadvertently closed, thereby limiting opening the fluid circuit of the pump, permitting the pump to operate without any load of engine oil thereon.

In a further embodiment of the invention, there may be provided an outlet of said third conduit which is used as an oil drain, thereby providing a third function to the instant system.

It is accordingly an object of the invention to provide an readily attachable external fluid circuit, usable for purposes of pre- and post-ignition lubrication, over-pressure protection, and oil drainage.

It is another object to provide system of the above type which is particularly adapted to the needs of marine engines including turbo charged engines.

It is a further object of the invention to provide a self-contained, externally disposed hydraulic circuit with which manual activation of the pre- and post ignition lubrication and of a system circuit breaker is provided.

It is a still further object to provide a system of the above type for post-ignition lubrication of turbo-charged engines, over-pressure protection for obstructions within the oil galley of the engine and, integrated therewith, means for convenient drainage of oil from the engine.

It is a yet further object of the invention to provide protection to internal combustion engines having rapid start cycles which may actually, or potentially, outpace the start cycle of the primary lubrication system of the engine, thereby avoiding an engine start on dry or insufficiently lubricated bearings.

The above and yet other objects and advantages of the present invention will become apparent from the hereinafter set forth Brief Description of the Drawings, Detailed Description of the Invention and claims appended herewith.

DETAILED DESCRIPTION OF THE INVENTION

Figure 1:
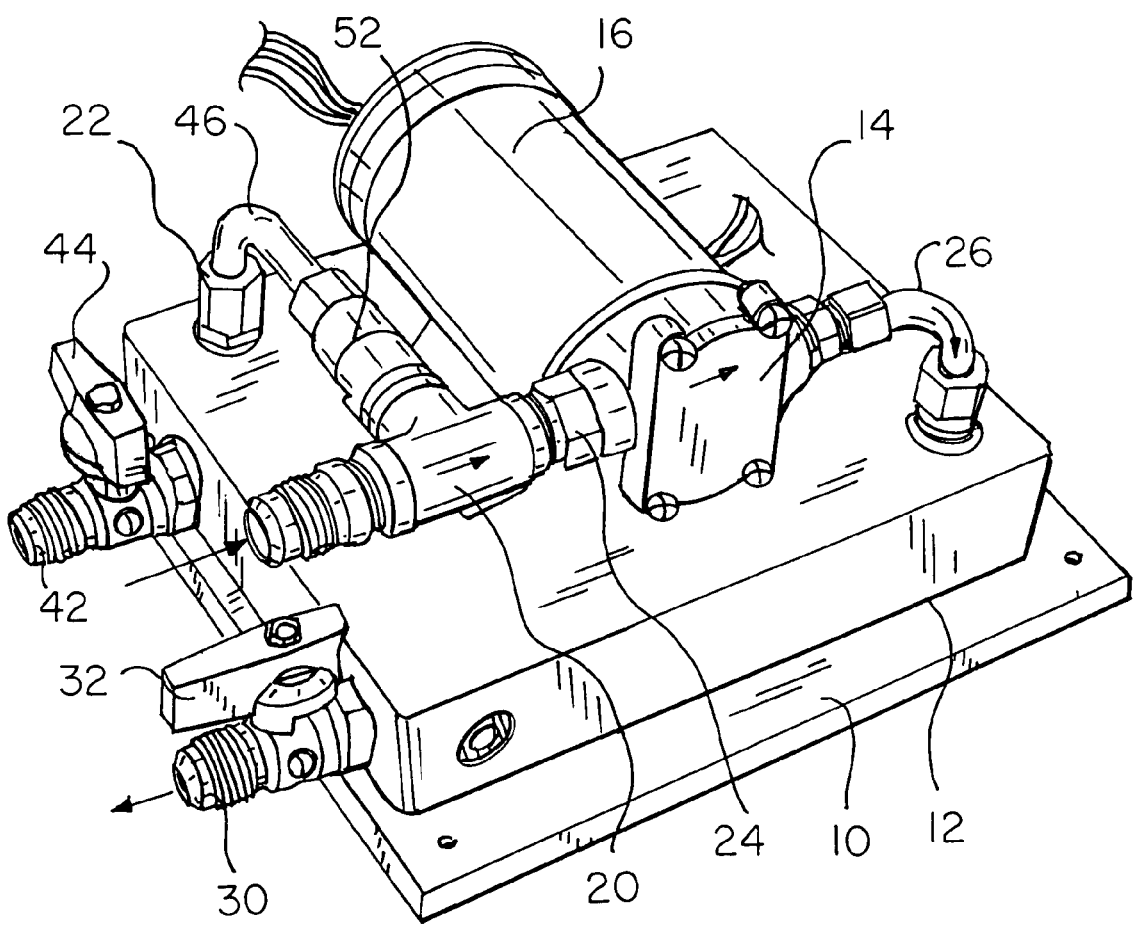
FIG. 1 is a perspective view of the inventive system showing the valves thereof set to the pre-lubrication function thereof.

With reference to the perspective view of FIGS. 1, 2 and 6, the inventive system may be seen to include a platform 10, and a manifold box 12 (more fully described below), an auxiliary oil pump 14, a motor 16 which powers said oil pump, a manual activation switch 18 (more fully described below) by which the oil change and circuit breaker functions of the system may be accomplished.

Figure 2:
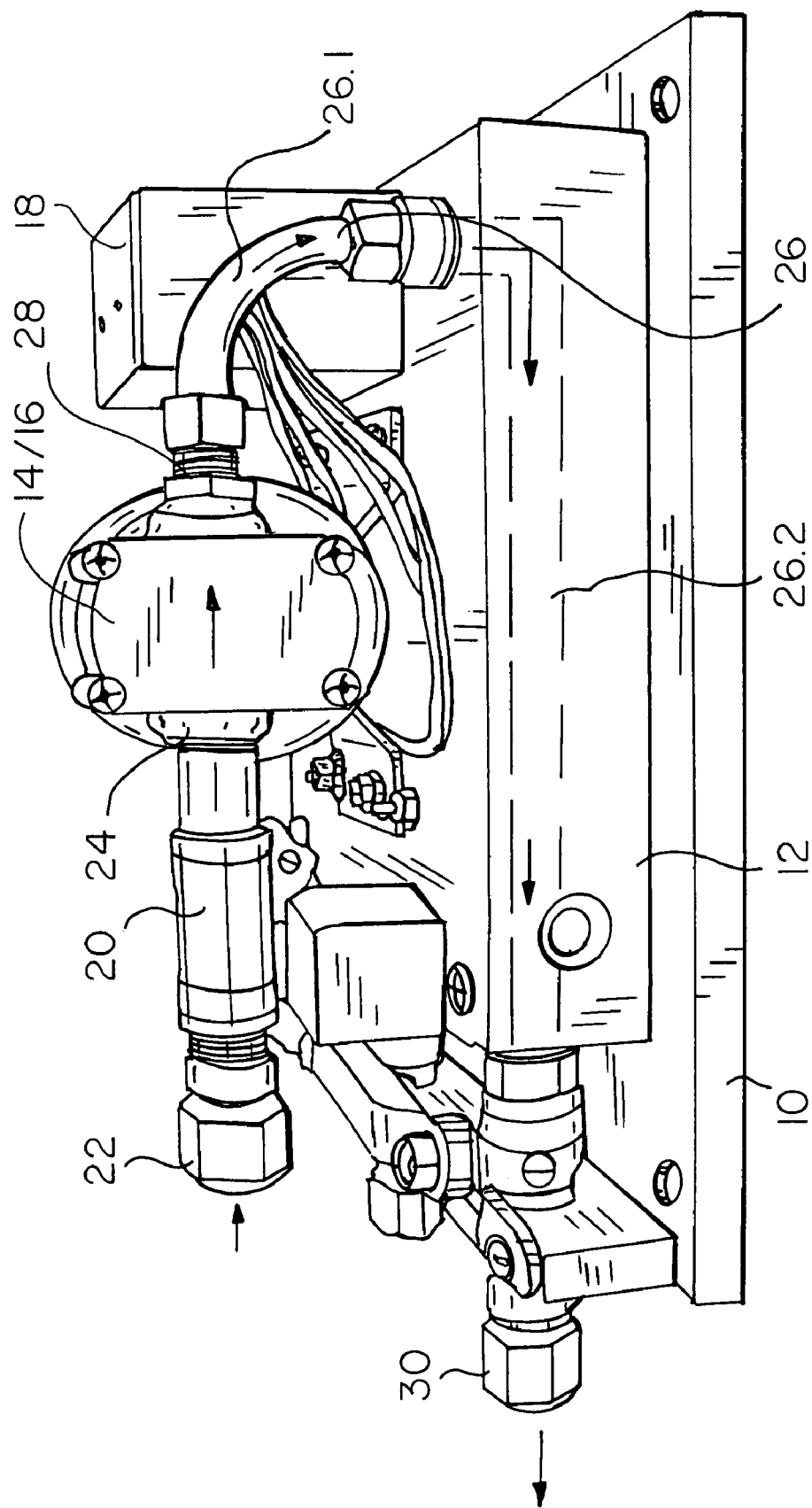
FIG. 2 is a front side view of FIG. 1 showing, in phantom, the pre-lubrication circuit thereof.
Figure 6:
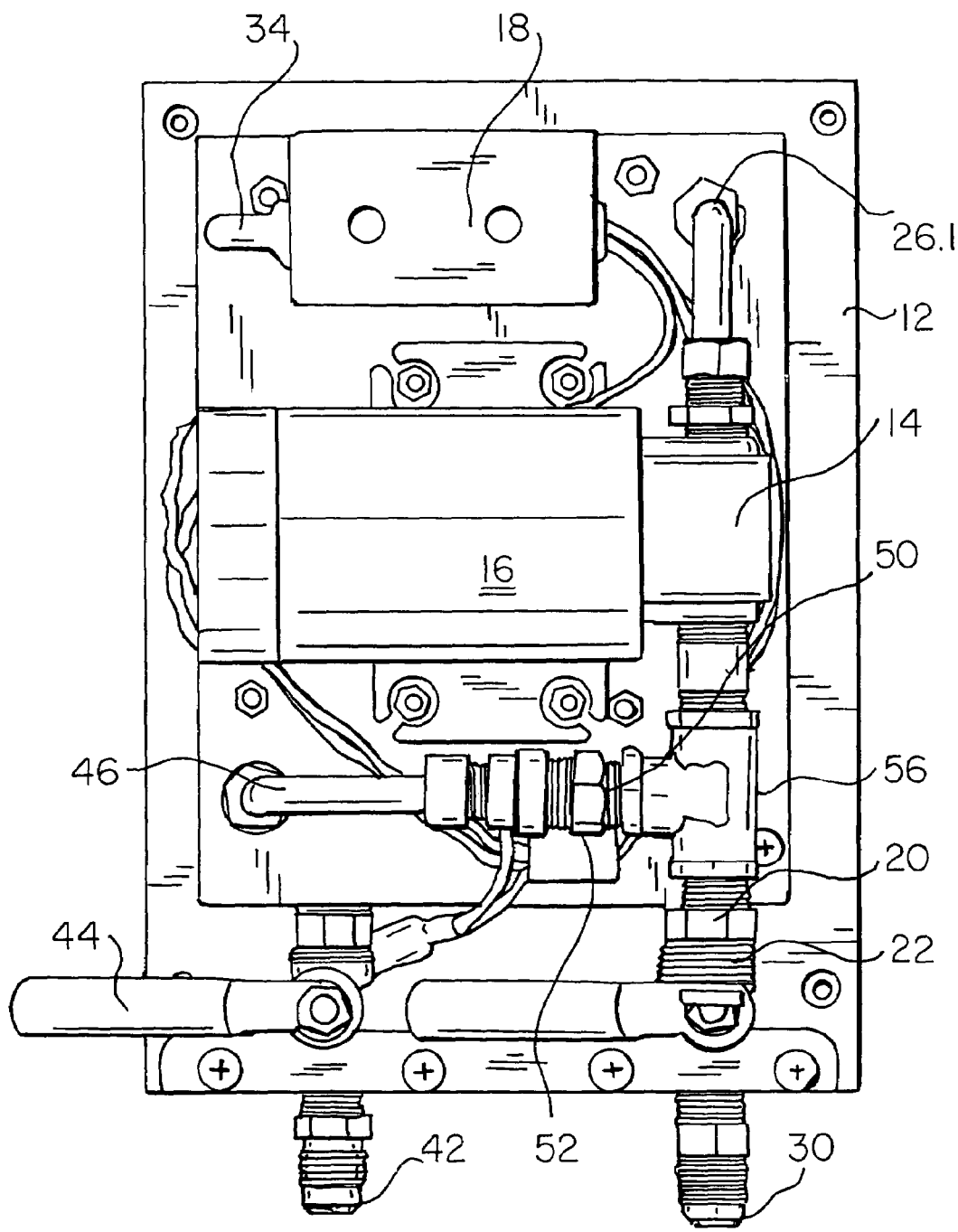
FIG. 6 is a top view of the present system in which the manual activation switch is set for oil change and circuit interruption, as well as the location of the pressure relief valve may be seen.

In FIGS. 2 and 6 may be seen the oil circuit associated with the pre- and post-lubrication system. More particularly, there is shown a first conduit 20 which includes an inlet 22 and an outlet 24. Said inlet is in fluid communication with an output of said oil reservoir of the internal combustion system with which the system is to be used, while outlet 24 of first conduit 20 provides a fluid inlet to said hydraulic or oil pump 14. As above noted, pump 14 is powered by pump motor 16 which is available in both 12 and 24 volt DC models, the 12 volt DC model. A suitable pump for this application has been found to be one having a fluid transfer capacity of 3 GPM (11 LPM) that can accommodate hydraulic pressures in a range of 40 to 45 psi (200 to 220 hg cm), and having a momentary switch, a reversing switch, and an on/off switch.

After passing through oil pump 14, which constitutes an oil pump auxiliary to the internal oil pump of the internal combustion engine with which the instant system is used, begins a second conduit 26 which, through inlet 28, is in fluid communication with the output of said oil pump and, through an outlet 30, is in fluid communication with an engine oil passageway or oil galley of the engine. As may be noted in FIG. 1, said output 30 is provided with manual open/closed engine galley valve 32, and will normally be in the open position, as is shown in FIG. 1. As may be noticed with reference to FIG. 2, said second conduit 26 includes an upper portion 26.1 and a lower portion 26.2 which passes through manifold box 12 and, thereby, is not visible in the views of FIGS. 1, 3 4 and 6.

Figure 7:
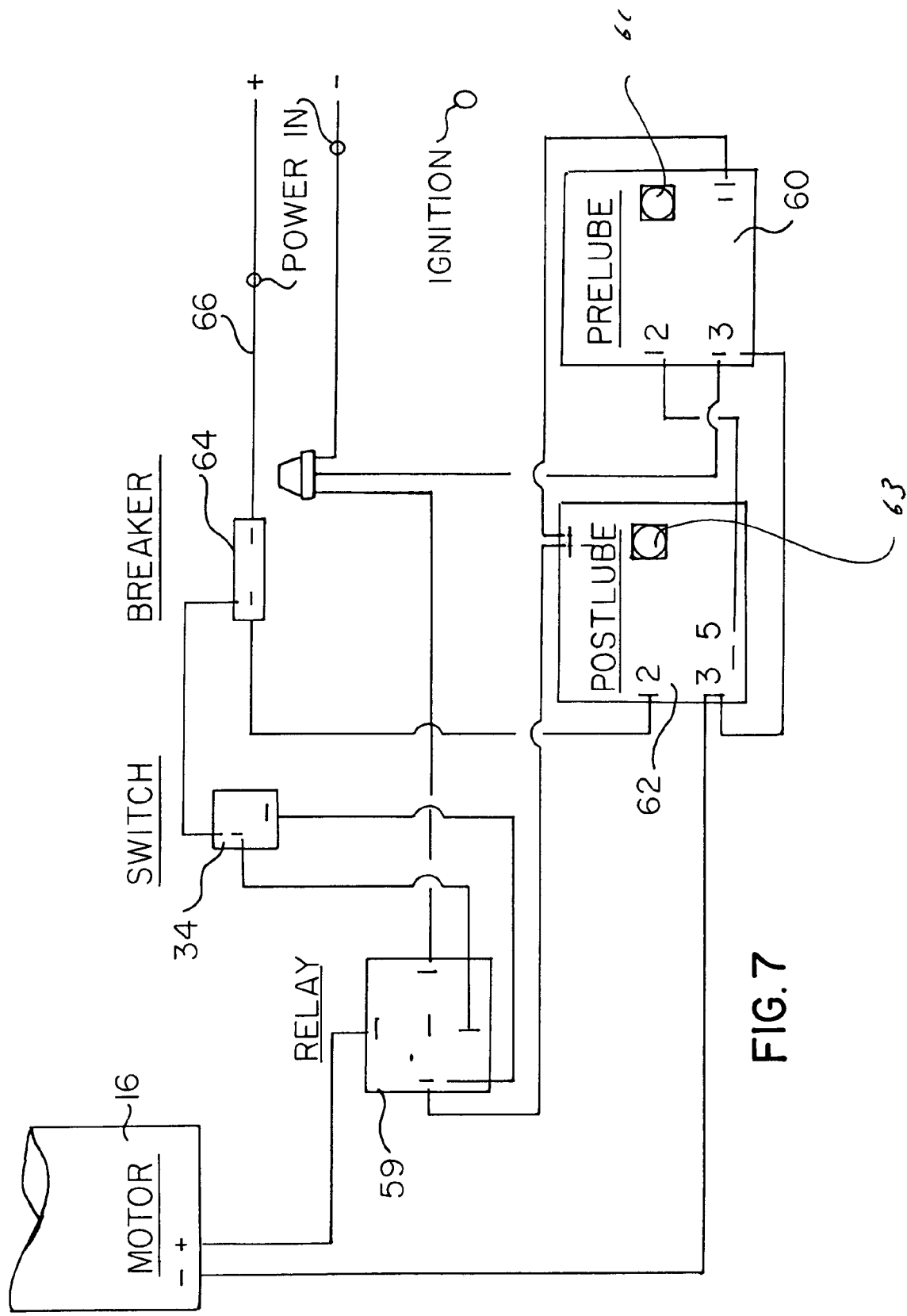
FIG. 7 is an electrical schematic showing the circuitry associated with the present system.

The electrical circuitry, provided within electrical control box 18, is shown in FIG. 7. Therein, a switch 34 (see also FIG. 6) permits a user of the present system to turn on the pre-lubrication function prior to starting the engine, until the operator sees the oil pressure rise on the oil pressure gauge of the boat, or other vehicle, to a sufficient level, upon which the ignition switch can be turned on and the engine safely started. Typically, it has been found that operation of the pre-lubrication circuit of the present system for a period of 15 seconds is sufficient to increase oil pressure to a safe level. In a given case, the ignition can be disabled for a period of 15 to 30 seconds, after auxiliary pump 14 has been turned on. This is of particular utility in vehicles not equipped with an oil pressure gauge.

Figure 3:
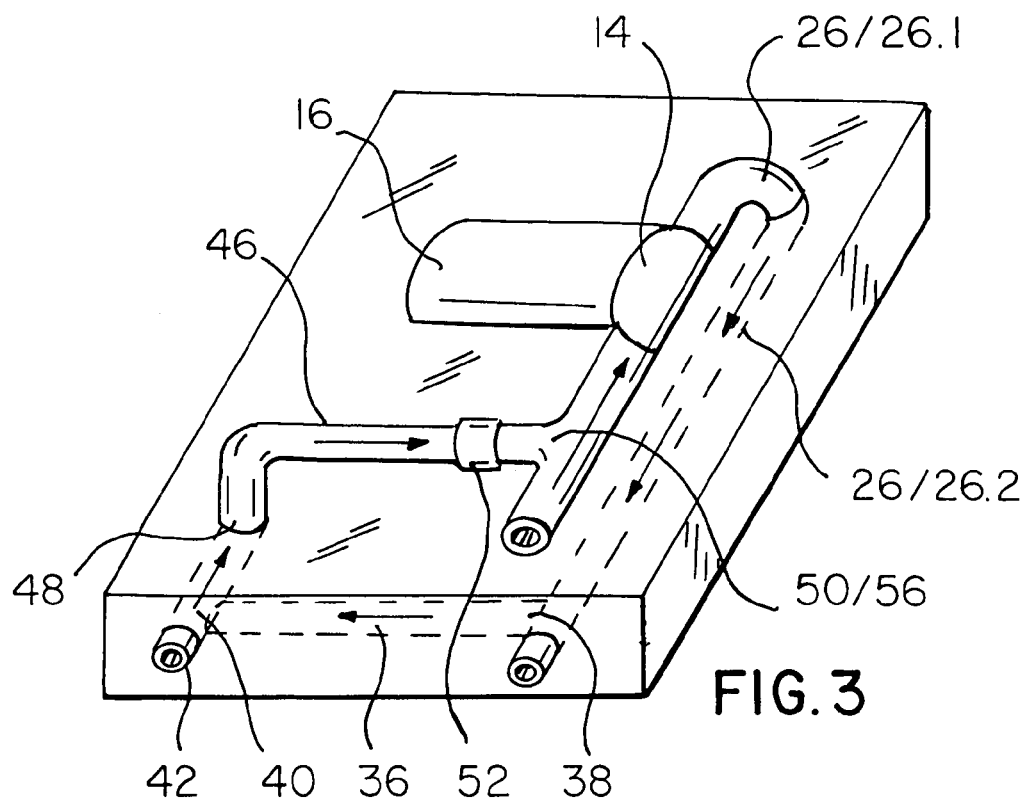
FIG. 3 is a schematic view of the pressure-relief circuit of the present system.

The instant system also includes a pressure relief circuit which is more particularly shown in the view of FIG. 3. Said circuit is facilitated by a third conduit 36 (see FIG. 3) having an inlet 38 which is in fluid communication with said outlet 30 of said second conduit 26, however upstream of said normally open-manual valve 32. An outlet 40 of said third conduit 36 is in fluid communication with an oil drain 42 which is controlled by a second manual valve 44. Said third conduit 36 is employed in both the pressure relief circuit (see FIG. 3) and the oil drainage circuit. However, the pressure relief function of the system is facilitated by a fourth conduit 46 having an inlet 48 which is in fluid communication with said outlet 40 of said third conduit 36.

Disposed within said fourth conduit, but prior to outlet 50 thereof, is a pressure relief valve 52, the function of which is to sense the occurrence of any overpressure condition which may arise within the oil galleys of the engine or within any of the fluid circuits of the inventive system. When this occurs, the oil in the auxiliary system will circulate only within an endless loop comprising the four conduits of the system.

Figure 4:
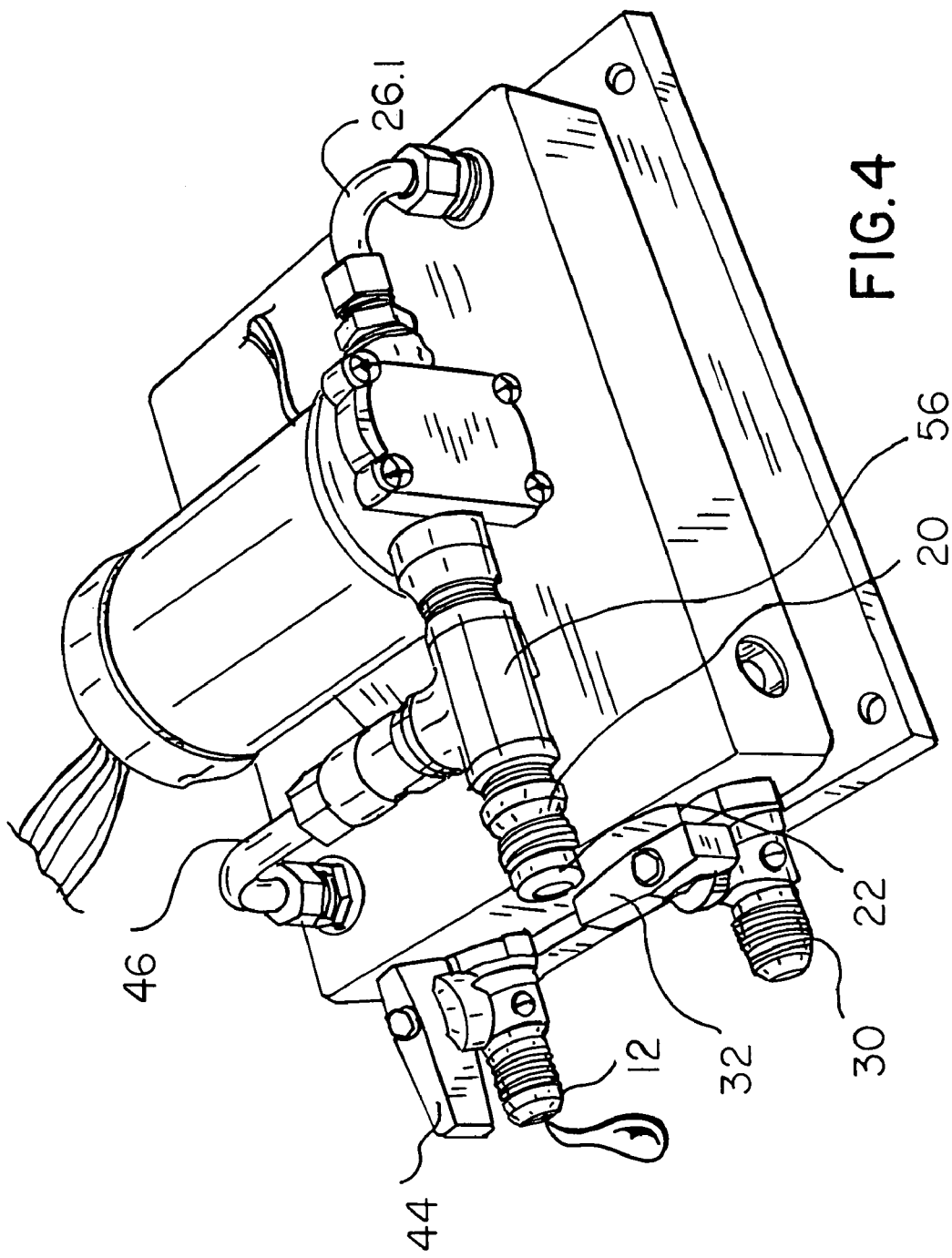
FIG. 4 is a perspective view of the present system when the valves thereof are set for the oil changing function thereof.

Shown in FIGS. 4 and 6 is a three-way fluid junction 56 which facilitates the fluid flow from outlet 50 of said forth conduit 46 into said first conduit 20.

Figure 5:
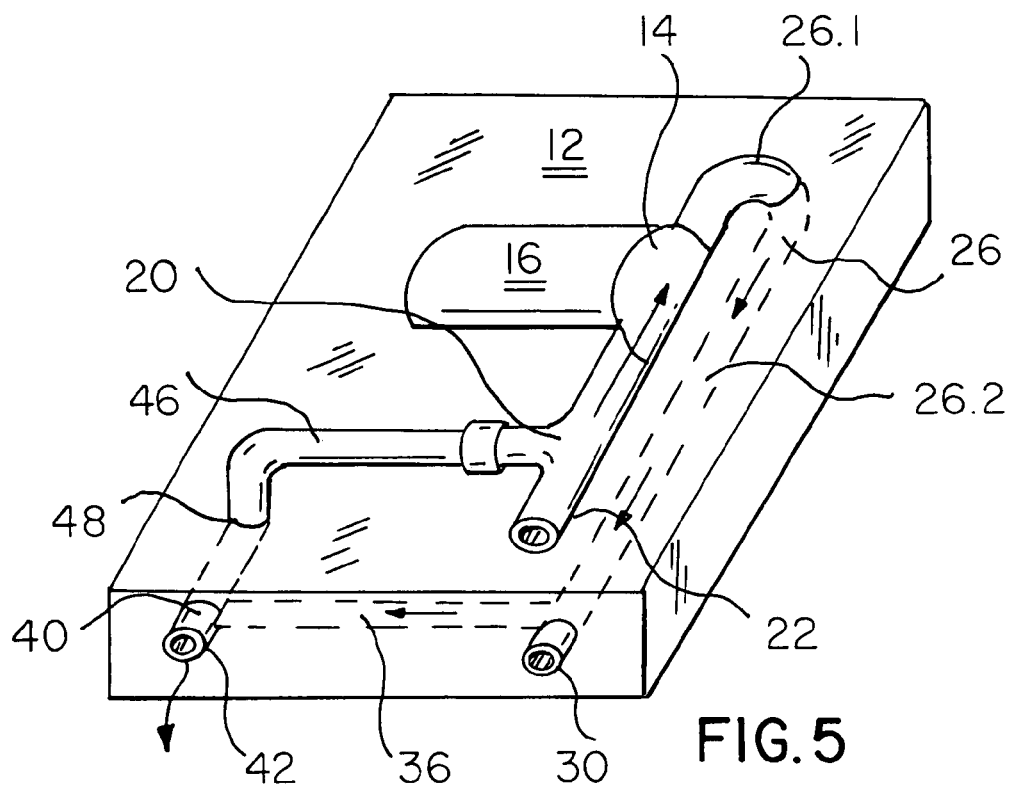
FIG. 5 is a front schematic view of FIG. 4, in which the oil flow path associated therewith is shown in phantom.

In FIGS. 4 and 5 may be seen the engine galley valve 32 as turned off, such that, in the manner shown in FIG. 3, oil which enters inlet 22 of first conduit 20, from the engine oil pan, will circulate through auxiliary oil pump 14, second conduit 26 and then (see FIG. 5) to the left and into third conduit 36 with oil drain valve 44 (see FIG. 4) opened, while the oil, following the path of least pressure, will exit through oil drain 42, as opposed to entering pressure release/fourth conduit 46. Therein, by simple manual actuation of said switch 34 (see FIGS. 6 and 7) oil pump motor 16 is turned on after engine valve 32 has been closed and oil drain valve 44 has been opened. There is accordingly provided a compact, easy-to-operate and economic external system for pre-lubrication, overpressure protection, oil change, and post-engine shutdown turbo-bearing lubrication.

As may be further noted with reference to FIG. 7, the electrical circuit includes a pre-lubrication circuit control 60 and its timer 61, as well as a post-ignition control 62, and its timer 63, which provides electrical power in the circuit after the ignition has been turned off, thereby providing oil to the turbo-bearings after the engine is shut-down.

After pre-lubrication, the present system remains a part of the fluid/oil system of the internal combustion engine, thereby enabling the pressure relief valve 52 to continue to monitor overpressure conditions. It is to be further noted that pre-lube block 60 includes said pre-ignition timer 61, and post-lubrication block 60 includes said post-lubrication timer 63. Further shown in FIG. 7 is a circuit breaker 64 which will open line 66 in the event that the system overloads the DC source (battery).

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

What is claimed is:

1. In a system for pre- and post-ignition lubrication of an internal combustion engine having an oil reservoir and at least one oil passageway, from an oil galley of the engine, communicating externally thereof, an oil circulation circuit auxiliary to that of said engine, said circuit comprising:
   (a) a first conduit having an inlet and an outlet, said inlet in fluid communication with an outlet of said oil passageway of said engine,
   (b) an auxiliary oil pump, including power means therefore, having an inlet and an outlet, said inlet in fluid communication with said outlet of said first conduit;
   (c) a second conduit having an inlet and an outlet, said inlet in fluid communication with said outlet of said pump, said outlet thereof in fluid communication with said engine oil passageway;
   (d) means, including timing means, for selectably actuating said power means of said pump for a selectable periods of time prior to ignition, after ignition stops, or both;
   (e) means for selectably closing said outlet of said second conduit at or upstream of, said inlet to said engine oil passageway, wherein said closing means are is normally-open;
   (f) a third conduit having an inlet and an outlet, said inlet in fluid communication with said outlet of said second conduit, said inlet disposed upstream of said normally-open closing means of said second conduit;
   (g) a fourth conduit having an inlet and an outlet, said inlet in fluid communication with said outlet of said third conduit, said outlet thereof in fluid communication with said first conduit and upstream of said auxiliary oil pump;
   (h) a pressure relief valve disposed within said fourth conduit between said inlet and outlet thereof;
   (i) an oil drain in fluid communication with said outlet of said third fluid conduit;
   (j) means for selectably opening said oil drain when said outlet of said second conduit is closed during pre-ignition; and
   (k) means for selectably opening said oil drain when said outlet of said second conduit is closed during post-ignition.

2. The oil circuit as recited in claim 1, further comprising:
   means for manual re-setting of a circuit breaker after an overload condition has interrupted to electrical power to said power to said oil pump.

3. The oil circuit as recited in claim 1, further comprising:
   means for manual actuation of said oil change circuit drain.

4. The oil circuit as recited in claim 2, further comprising:
   (l) an oil drain in fluid communication with said outlet of said third fluid conduit; and
   (m) means for selectably opening said oil drain when said outlet of said second conduit is closed during pre-ignition; and
   (n) means for selectably opening said oil drain when said outlet of said second conduit is closed during post-ignition.

* * * * *